United States Patent [19]

Weghaupt et al.

[11] 4,210,834
[45] Jul. 1, 1980

[54] DEVICE FOR COOLING AND ELECTRICALLY CONNECTING FIELD-CURRENT LINES TO WATER-COOLED TURBOGENERATOR ROTORS

[75] Inventors: Erich Weghaupt; Gerhard Krieger, both of Mülheim, Fed. Rep. of Germany

[73] Assignee: Kraftwerk Union Aktiengesellschaft, Mülheim, Fed. Rep. of Germany

[21] Appl. No.: 907,187

[22] Filed: May 18, 1978

[30] Foreign Application Priority Data

May 23, 1977 [DE] Fed. Rep. of Germany ....... 2723202

[51] Int. Cl.$^2$ ............................................. H02K 1/32
[52] U.S. Cl. ......................................... 310/61; 310/71
[58] Field of Search ....................... 310/54, 53, 57, 58, 310/60, 61, 59, 65, 71, 165

[56] References Cited

U.S. PATENT DOCUMENTS

| | | | |
|---|---|---|---|
| 3,686,522 | 8/1972 | Konovalov | 310/54 |
| 3,733,502 | 5/1973 | Curtis | 310/61 |
| 3,878,413 | 4/1975 | Madsen | 310/59 |
| 3,908,140 | 9/1975 | Fidei | 310/54 |
| 3,916,230 | 10/1975 | Albaric | 310/61 |
| 3,955,111 | 5/1976 | Weghaupt | 310/54 |
| 4,066,921 | 1/1978 | Blank | 310/61 |

Primary Examiner—R. Skudy
Attorney, Agent, or Firm—Herbert L. Lerner

[57] ABSTRACT

A water-cooled turbogenerator rotor mounted on a rotor shaft and having water-cooled end turn leads surrounded by a rotor end-bell and further having radial current-contact pins contacting ends of exciter current lines disposed in the rotor shaft, the pin being cooled by cooling water fed thereto through high-pressure insulating hoses from cooling-water distribution chambers provided on the rotor shaft, the pins being connectible at radially outer ends thereof to the water-cooled end turn leads disposed in slots formed on the rotor shaft and to the high-pressure insulating hoses, a device for cooling and electrically connecting the exciter current lines includes respective widened contact straps formed at respective ends of the end turn leads extending out from the rotor end bell and at the respective radially outer ends of the current-contact pins, the widened contact straps of the end turn leads and the current-contact pins being received in a slot formed in the surface of the rotor shaft and being in mutually abutting relationship, and a connecting strap overlying the widened contact straps and electrically, hydraulically and mechanically connecting the widened contact straps, the connecting straps being formed with cooling-water channels and means for connecting the cooling-water channels to the high-pressure insulating hoses.

7 Claims, 3 Drawing Figures

DEVICE FOR COOLING AND ELECTRICALLY CONNECTING FIELD-CURRENT LINES TO WATER-COOLED TURBOGENERATOR ROTORS

The invention relates to a device for cooling and electrically connecting exciter or field-current lines in a water-cooled turbo-generator rotor, wherein radial current-connecting or contact pins which make contact with those ends of the exciter-current lines installed in the rotor shaft that are on the rotor side of the shaft, are cooled by cooling water fed through high-pressure insulating hoses from cooling water distribution chambers provided on the rotor shaft, and wherein the radially outer end of the current-contact pin comprises electrical and/or hydraulic connection to water-cooled end turn leads received in slots formed on the rotor shaft and to the high-pressure insulating hoses.

Such a construction has become known heretofore from German Published Non-Prosecuted Application DE-OS No. 23 46 639. In such rotors, ready accessiblity of the exciter or field-current lines and all connection points for inspection is of considerable importance. Due to the generally predetermined spacing between the end of the rotor end-bell or cap and the cooling water distribution chamber on the rotor shaft as well as the fact that the radial current-contact pin must have an insulated cooling-water connection with a predetermined minimum distance from the water supply chambers, the connecting points between the current-contact pin and the axial end turn leads are usually covered up by the end of the rotor end-bell or cap.

It is accordingly an object of the invention to provide a device wherein, on the one hand, the exciter-current lines and, especially the radial current-contact pin are readily accessible and wherein, on the other hand, the required connection points are so constructed as to be relatively simply and easily detachable or releasable.

With the foregoing and other objects in view, there is provided, in accordance with the invention, a water-cooled turbogenerator rotor mounted on a rotor shaft and having water-cooled end turn leads surrounded by a rotor end-bell and further having radial current-contact pins contacting ends of exciter current lines disposed in the rotor shaft, the pins being cooled by cooling water fed thereto through high-pressure insulating hoses from cooling-water distribution chambers provided on the rotor shaft, the pins being connectible at radially outer ends thereof to the water-cooled end turn leads disposed in slots formed on the rotor shaft and to the high-pressure insulating hoses, a device for cooling and electrically connecting the exciter current lines comprising respective widened contact straps formed at respective ends of the end turn leads extending out from the rotor end bell and at the respective radially outer ends of the current-contact pins, the widened contact straps of the end turn leads and the current-contact pins being received in a slot formed in the surface of the rotor shaft and being in mutually abutting relationship, and a connecting strap overlying the widened contact straps and electrically, hydraulically and mechanically connecting the widened contact straps, the connecting strap being formed with cooling-water channels and means for connecting the cooling-water channels to the high-pressure insulating hoses.

By laying the required insulating length for the water connection into the cooling water distribution chamber per se, it is possible, with the given spacing between the rotor end-bell or cap and the cooling water distribution chamber, to relocate the radial current-contact pin and the corresponding connection points so far away axially from the vicinity of the rotor end-bell or cap that these parts are readily accessible.

In accordance with another feature of the invention, the cooling-water channels formed in the connecting strap comprise an axial cooling channel and a radial cooling channel extending from an end of the axial cooling channel and connected to a cooling channel formed in a respective end turn line, and another radial cooling channel connected to a cooling channel formed in a respective radial current-contact pin, and the means for connecting the cooling-water channels to the high-pressure insulating hoses comprising a cranked neck member.

In accordance with a further feature of the invention, the device includes threaded fastening means mutually connecting the contact straps and the connecting strap.

In accordance with an added feature of the invention, the device includes locking wedges and a wedge lock retaining the connecting strap and the contact straps against radial displacement.

In accordance with an additional feature of the invention, the cooling-water distribution chambers are formed with an axial bore closable at an end thereof, the respective high-pressure insulating hose being received in the axial bore, and including another axial bore and a deflecting union connecting the high-pressure insulating hose to the other bore and therethrough to a cold water supply chamber formed in the rotor shaft.

In order to relieve the current-contact pin of axial stresses due to thermal expansion of the exciter current lines, and in accordance with yet another feature of the invention, the device includes pin means located adjacent the respective current-contact pin for locking the exciter current lines in the rotor shafts against axial displacement.

In accordance with a concomitant feature of the invention, the pin means comprise a locking pin extending radially inwardly from the base of the slot respectively formed on the rotor shaft and within a corresponding through-bore formed in the respective exciter current line and aligned with the bore formed in the rotor shaft. Other features which are considered as characteristic for the invention are set forth in the appended claims.

Although the invention is illustrated and described herein as embodied in device for cooling and electrically connecting field-current lines to water-cooled turbogenerator rotors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 1:
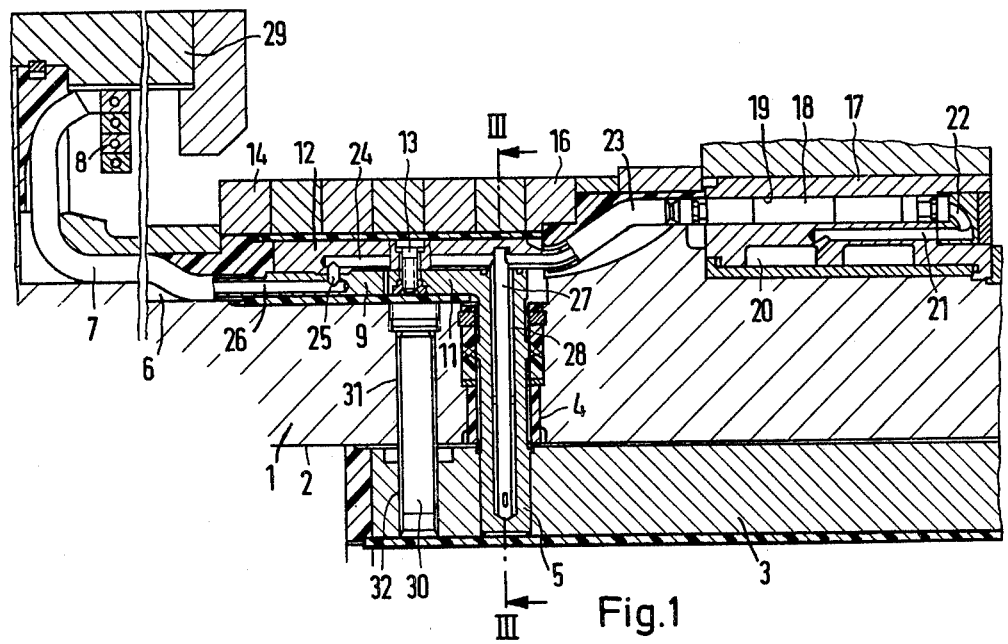
FIG. 1 is a fragmentary longitudinal sectional view of the rotor of a turbogenerator over the axial region thereof from the cooling-water distribution chamber thereof to the end turn thereof held by the rotor end-bell.
Figure 2:
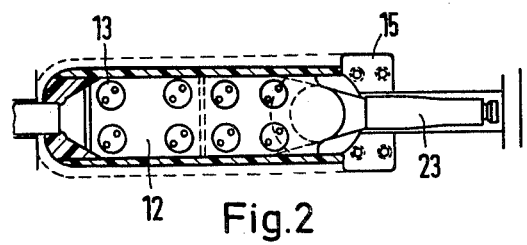
FIG. 2 is a fragmentary top plan view of FIG. 1 showing a connecting strap thereof disposed in a widened slot.
Figure 3:
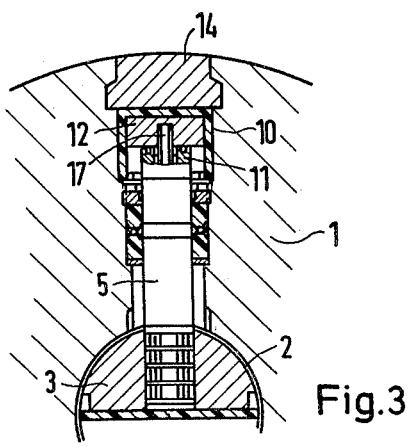
FIG. 3 is a cross-sectional view of FIG. 1 taken along the line III—III in direction of the arrows and showing a radial current contact pin and the connecting strap.

Referring now to the drawing and first, particularly, to FIG. 1 thereof, there is shown a field-current line 3, into which a current-contact pin 5 is inserted through a radial shaft bore 4. The field-currentline 3 is disposed in an axial bore 2 formed in a rotor shaft 1. The field current thus flows, from nonillustrated rotating rectifiers or slip rings of the rotor, at the end of the shaft 1 beyond the right-hand side of FIG. 1 at which the conventional non-illustrated exciter is located, through the field current lines 3 and the radial current-contact pins 5, to end turn leads 7 laid in a slot 6 formed on the shaft surface and into the end turn 8, which is braced or stressed radially outwardly by the rotor end-bell 29.

In accordance with the invention, the radially inner end of the end-turn lead 7 is provided with a widened contact strap or plate 9, which is disposed in a widened shaft slot 10. The radial current-contact or connecting pin 5 likewise has, at the radially outer end thereof, a widened contact strap or plate 11 which is also disposed in the shaft slot 10 and terminates at the end face of the contact strap or plate 9 of the end turn or winding lead 7. For electrical, hydraulic and mechanical connections, a connecting strap 12 is further provided which overlies the two contact straps 9 and 11 and is connected to them by screws 13. The two contact straps 9 and 11, as well as the connecting strap 12 thereabove, are retained by locking wedges 14 disposed in the slot 10 as well as by an exposed wedge lock 16 which is screwed to the bottom 15 of the slot 10.

As is apparent from FIG. 1, for better accessibility, the radial current-connecting or contact pin 5 as well as the contact and connecting straps or plates 9, 11 and 12 are disposed offset in axial direction relative to the rotor end-bell or cap 29, so that these connecting locations can be loosened readily from the outside. A problem arises with respect to this arrangement, however, due to the fact that the distance between the rotor cap or end-bell 29 and the cooling-water distribution chamber 17 is generally fixed, but the water-cooled current-connecting or contact pin 5 must be spaced from the cooling-water distributionchamber 17 a given insulating distance formed by an high-pressure insulating hose 18 for conducting the cooling water. In order to ensure the maintenance of this insulating distance, this high-pressure insulating hose 18 is disposed in an axial bore 19 formed in the water distribution chamber 17. Connection to the hose 18 in the distribution chamber 17 is made from a radially inner cold-water chamber 20 through another axial bore 21 and a deflection tube or passage 22 which is connected to an end of the high-pressure insulating hose 18.

The other end of the insulating hose 18 is connected to a connecting end portion constructed as an offset or cranked neck 23 of the connecting strap or plate 12. The connecting strap 12 is formed with an axial cooling channel 24, and a radial connecting channel 25 is provided for connecting the axial channel 24 to a cooling channel 26 formed in the end turn lead 7. The connecting strap 12 is also provided with a radial connection or union 27 for a cooling water channel provided in the radially extending current-connecting or contact pin 5. The cooling water thus flows from the cold-water chamber 20 through the bore 21 and the deflecting piece or union 22 into the high-pressure insulating hose 18 and from there through the offset or cranked neck 23 of the connecting strap or plate 12 and is then deflected into the radial cooling-water tube 27 in the current-connecting or contact pin 5, from which, after leaving at the lower end thereof, as viewed in FIG. 1, through an annular or ring channel 28, it returns to the upper end of the current-connecting or contact pin 5 and into the axial channel 24 of the connecting strap or plate 12. From the axial channel 24, the cooling water is then conducted through the union 25 and the channel 26 of the end turn lead 7 to the end turn 8 and the individual exciter conductors.

Through the aforedescribed construction, the current-connecting or contact pin 5 is thus readily accessible and detachable or releasable for inspection and, in general, all of the connecting points and, also, the seals of the cooling-walter paths are readily accessible and also require no .assembly or installation soldering because of the hereinaforedescribed construction thereof. In addition, the high-pressure insulating hose 18 can be disassembled and removed quite readily from the water chamber 17.

To fix the exciter current lead 3 against axial displacement and, thereby, relieve the current contact or connecting pin 5 from bending stresses, a locking pin 30 is additionally disposed adjacent the current contact pin 5, the locking pin 30 being inserted radially from the outside into a shaft bore 31 radially extending from the base of the shaft slot 10 and into a corresponding aligned bore 32 formed in the exiter current lead 3. Due to the overall construction, this locking pin 30 can easily be removed for inspection, so that the exciter current leads 3 are also then disassemblable and removable from the shaft bore 2.

There is claimed:

1. In a water-cooled turbogenerator rotor mounted on a rotor shaft and having water-cooled end turn leads surrounded by a rotor end-bell and further having radial current-contact pins contacting ends of exciter current lines disposed in the rotor shaft, the pins being cooled by cooling water fed thereto through high-pressure insulating hoses axially connected to cooling water distribution, chambers provided on the rotor shaft, the pins being connectible at radially outer ends thereof to the water-cooled end turn leads disposed in slots formed on the rotor shaft and to the high-pressure insulating hoses, a device for cooling and electrically connecting the exciter current lines comprising respective widened contact straps formed at respective ends of the end turn leads extending out from the rotor end-bell and at the respective radially outer ends of the current-contact pins, said widened contact straps of said end turn leads and said current-contact pins being received in a slot formed in the surface of the rotor shaft and being in mutually abutting relationship, and a connecting strap overlying said widened contact straps and electrically, hydraulically and mechanically connecting said widened contact straps, said connecting straps being formed with cooling-water channels and means for connecting said cooling-water channels to the high-pressure insulating hoses, said radial current-contact pins and said connecting straps being disposed beyond the rotor end-ball in axial direction of the rotor shaft.

2. Device according to claim 1 wherein said cooling-water channels formed in said connecting strap comprise an axial cooling channel and a radial cooling channel extending from an end of said axial cooling channel and connected to a cooling channel formed in a respective end turn line, and another radial cooling channel connected to a cooling channel formed in a respective radial current-contact pin, and said means for connecting said cooling-water channels to the high-pressure insulating hoses comprising a cranked neck member.

3. Device according to claim 1 including threaded fastening means mutually connecting said contact straps and said connecting strap.

4. Device according to claim 1 including locking wedges and a wedge lock retaining said connecting strap and said contact straps against radial displacement.

5. Device according to claim 1 wherein the cooling-water distribution chambers are formed with an axial bore closable at an end thereof, the respective high-pressure insulating hose being received in said axial bore, and including another axial bore disposed adjacent said first-mentioned axial bore and a deflecting union connecting the high-pressure insulating hose to said other axial bore and therethrough to a cold water supply chamber formed in the rotor shaft.

6. Device according to claim 1 including pin means located adjacent a respective current-contact pin for locking the exciter current lines in the rotor shaft against axial displacement.

7. Device according to claim 6 wherein said pin means comprise a locking pin extending radially inwardly from the base of the slot respectively formed on the rotor shaft within a bore formed in the rotor shaft and within a corresponding through-bore formed in the respective exciter current line and aligned with said bore formed in the rotor shaft.

* * * * *